United States Patent [19]
Appa

[11] Patent Number: 5,921,506
[45] Date of Patent: Jul. 13, 1999

[54] EXTENDIBLE LEADING EDGE FLAP

[75] Inventor: Kari Appa, Lake Forest, Calif.

[73] Assignee: Northrop Grumman Corporation, Los Angeles, Calif.

[21] Appl. No.: 08/936,631

[22] Filed: Sep. 25, 1997

[51] Int. Cl.$^6$ ..................................................... B64C 3/44
[52] U.S. Cl. ........................ 244/219; 244/214; 244/218; 244/76 R
[58] Field of Search ................................... 244/219, 214, 244/217, 218, 215, 76 R

[56] References Cited

U.S. PATENT DOCUMENTS

| | | | |
|---|---|---|---|
| 1,427,012 | 8/1922 | Page | 244/219 |
| 2,343,986 | 3/1944 | Leutholt | 244/44 |
| 2,938,680 | 5/1960 | Greene et al. | 244/42 |
| 3,486,720 | 12/1969 | Seglem et al. | 244/42 |
| 3,904,152 | 9/1975 | Hill | 244/43 |
| 4,360,176 | 11/1982 | Brown | 244/214 |
| 4,455,004 | 6/1984 | Whitaker, Sr. | 244/90 R |
| 4,651,955 | 3/1987 | Krafka | 244/76 C |
| 4,729,528 | 3/1988 | Borzachillo | 244/90 R |
| 4,796,192 | 1/1989 | Lewis | 364/463 |
| 5,082,207 | 1/1992 | Tulinius | 224/219 |
| 5,156,358 | 10/1992 | Gerhardt | 244/214 |
| 5,344,103 | 9/1994 | Fitzgibbon et al. | 244/75 R |
| 5,740,991 | 4/1998 | Gleine et al. | 244/219 |

*Primary Examiner*—J. Woodrow Eldred
*Attorney, Agent, or Firm*—Terry J. Anderson; Karl J. Hoch, Jr.

[57] ABSTRACT

A flight control system comprises trailing edge airfoil members pivotally mounted at the trailing edge of each wing of an aircraft and selectively movable on a laterally extending axis between raised and lowered positions for imparting rolling motion to the aircraft. Leading edge airfoil members mounted adjacent the leading edge on each of the wings are movable transversely of the leading edge between a retracted position generally coextensive with the leading edge and an extended position protruding from the leading edge for imparting countervailing aerodynamic forces on the wings to counteract the effects of aeroelastic wing deformation caused in response to operation of the trailing edge airfoil members by increasing the angle of attack of the wing and lift producing surface area of the wing. A pair of actuator mechanisms are mounted on a wing box member at laterally spaced locations for moving the leading edge airfoil members between the retracted and extended positions. The actuator mechanisms are operable simultaneously such that, in one instance, they move the upper and lower control rods in unison to move the leading edge airfoil member between the retracted and extended positions with no change in its angular position relative to the wing and, in another instance, move the leading edge airfoil members to the extended position while exhibiting a nose down position relative to the wing and, in still another instance, move the leading edge airfoil members to the extended position while exhibiting a nose up position relative to the wing.

6 Claims, 4 Drawing Sheets

EXTENDIBLE LEADING EDGE FLAP

BACKGROUND OF THE INVENTION

1. Field of the Invention

The present invention relates generally to maneuver performance of an aircraft and, more particularly, to a system for offsetting the aeroelastic effect when performing roll maneuvers without increasing the structural rigidity of the wing. In another manner of speaking, the concept of the invention is to avoid adverse wing twist and increase the aerodynamic effectiveness of the control surfaces of high performance tactical aircraft.

2. Description of the Prior Art

Whenever trailing edge control surfaces are employed to perform roll maneuvers, the wing twists, rotating the leading edge downward, resulting in reduced lift and consequently decreased rolling moment. This is called the aeroelastic effect. With increasing dynamic pressure or speed the aileron effectiveness (i.e. its power to produce rolling moment) gradually reduces to zero. This velocity at which the roll rate becomes zero (see FIG. 1, curve TE-CS) is called the roll reversal speed. To achieve a required roll rate within the flight regime, the torsional stiffness of the wing box must be increased. This calls for increased structural weight and consequently decreased performance of the aircraft. To alleviate this situation, the extendible leading edge concept of the present invention is proposed. This concept applies equally well for aircraft which require leading edge flap deployment (e.g. the F-18) and for those which do not require leading edge flaps (e.g. the F-15). The prior art abounds with examples of aircraft control systems. A number of patents disclosing typical inventions pertinent to the present invention will now be presented.

U.S. Pat. No. 5,344,103 to Fitzgibbon et al. discloses an actuating system for aircraft wing slat and flap panels. The actuating system provides an actuation mechanism for wing slats and flaps designed to avoid unexpected high stresses due to wing flexibility and, in particular, addresses the actuation mechanism of wing slats and flaps which may result in misalignment and interference loads due to wing bending.

U.S. Pat. No. 5,082,207 to Tulinius discloses an active flexible wing aircraft control system to improve aileron reversal speed, flutter speed, and load alleviation. The invention of this patent is said to utilize modern active flight control technology in which a number of smaller conventional control surfaces are activated to redistribute the airload so that desired roll rate and flutter suppression can be achieved within the domain of flight envelop.

U.S. Pat. No. 4,796,192 to Lewis discloses a maneuver load alleviation system whose purpose is to minimize wing root bending moment when threshold load level is exceeded during maneuvers or gust encounters, and thereby increase fatigue life of wing root components. In this instance, achieved automatically by means of control systems, conventional flaps are deflected upward to reduce the local angle of attack, although such an operation is not intended to improve aileron effectiveness in roll maneuvers U.S. Pat. No. 4,729,528 to Borzachillo discloses an aeroelastic control flap whose purpose is to improve lateral and directional control during high stress maneuvers. This patented invention uses existing leading edge flaps and trailing edge flaps in a differential manner such that air load increases oil one wing and decreases on the other wing resulting in somewhat increased rolling moment, but at the cost of losing total lift. This loss of lift results in substantial altitude loss which is an undesirable occurrence in a combat area.

U.S. Pat. No. 4,651,955 to Krafka discloses a device for automatically controllable unloading of aircraft wings whose purpose is to minimize wing root bending moment when threshold load level is exceeded during maneuvers or gust encounters, and thereby increase fatigue life of wing root components. This is primarily a mechanical device which operates the control surfaces but would have no influence on improved roll performance.

U.S. Pat. No. 4,455,004 to Whitaker, Sr. discloses a flight control technique for aircraft in which spanwise movable control surfaces are provided at each wing tip. Its purpose is to minimize wing root bending moment during gust encounters to thereby increase fatigue life of wing root components. A secondary function is to provide additional rolling moment. These control surfaces must be located ahead of the elastic axis of the wing box. Extended booms are required to mount these control surfaces such that the concept would not be practical on fighter aircraft which carry wing tip missiles. Furthermore, adverse wing twist cannot be avoided by this invention.

U.S. Pat. No. 4,360,176 to Brown discloses a wing leading edge slat whose purpose is to provide smoothly contoured variable wing camber. This invention is mainly intended to provide aerodynamically smooth variable wing camber to achieve improved lift to drag ratio during takeoff. This patented invention does not address any maneuverable performance improvements.

U.S. Pat. No. 3,904,152 to Hill discloses a variable area, variable camber wing for aircraft whose purpose is to provide increased lift for short takeoff and landing operations. A mechanism is provided to extend the chord up to 70% and also increase the camber so that lift is increased without increasing pitching moment.

U.S. Pat. No. 3,486,720 to Seglem et al. discloses a continuous slot forming leading edge slats for cranked wings whose purpose is to provide continuous slot near the cranked wing junction of a supersonic wing. This patented invention describes a mechanism to deploy a wing slot near the cranked wing junction for increased lift for takeoff and landing of a supersonic transport aircraft but does not discuss maneuver performance nor aeroelastic effectiveness of control surfaces.

U.S. Pat. No. 2,938,680 to Greene et al. discloses a multiple position airfoil slat whose purpose is to provide an optimum wing leading edge configuration. This invention is particularly concerned with an improved type of automatically actuated slat for achieving an optimum wing leading edge configuration for widely separated flight environment conditions such as landing at low speeds and takeoffs with relatively short runs under heavy loads.

U.S. Pat. No. 2,343,986 to Leutholt discloses airfoil control for the purpose of providing lift, speed control and de-icing of an airfoil. An hydraulically actuated mechanism was developed to vary chord and effective camber of an airfoil so that desired lift and other characteristics required to meet different flight conditions could be achieved. This patented invention uses elastic material to cover the extended portion of the flap which introduces flutter problems in high speed flight vehicles.

U.S. Patent No. 1,427,012 to Page discloses an aircraft wing whose purpose is to increase the effective camber of the structure. An auxiliary wing is mounted so as to be parallel to and spaced from the leading edge of a primary wing and a mechanism is provided for selectively moving the auxiliary wing toward or away from the primary wing.

It was with knowledge of the foregoing state of the technology that the present invention has been conceived and is now reduced to practice.

SUMMARY OF THE INVENTION

The present invention relates to a flight control system in which trailing edge airfoil members are pivotally mounted at tile trailing edge of each wing of an aircraft and selectively movable on a laterally extending axis between raised and lowered positions for imparting rolling motion to the aircraft. Leading edge airfoil members mounted adjacent the leading edge on each of the wings are movable transversely of the leading edge between a retracted position generally coextensive with the leading edge and an extended position protruding from the leading edge for imparting countervailing aerodynamic forces on the wings to counteract the effects of aeroelastic wing deformation caused in response to operation of the trailing edge airfoil members by increasing the angle of attack of the wing and lift producing surface area of the wing. A pair of actuator mechanisms are mounted on a wing box members at laterally spaced locations for moving the leading edge airfoil members between the retracted and extended positions. Each leading edge airfoil member includes at least a pair of spaced apart integral upper and lower ear members aft of the nose and adjacent the upper and lower surfaces, respectively. Upper control rods are pivotally connected to an associated one of the upper ear members and lower control rods are pivotally connected to an associated one of the lower ear members. The actuator mechanisms are operable simultaneously such that, in one instance, they move the upper and lower control rods in unison to move the leading edge airfoil member between the retracted and extended positions with no change in its angular position relative to the wing and, in another instance, move the leading edge airfoil members to the extended position while exhibiting a nose down position relative to the wing and, in still another instance, move the leading edge airfoil members to the extended position while exhibiting a nose up position relative to the wing.

As proposed, the present invention suggests that the adverse wing twist caused by the trailing edge control surfaces can be eliminated by providing a controlled amount of nose tip pitching moment by extending forward the outboard leading edge flap or airfoil while the trailing edge control surfaces are being deployed. The elastic axis is a line or curve on a wing which passes through the shear center of a wing section, the shear center being that point on the wing section at which no twist occurs when a vertical force is applied. Since the elastic axis is determined by the center wing box and unchanged by extending the leading edge, the air load generated by the extension of the leading edge airfoil provides enough lift to untwist the wing from the deflection caused by the trailing edge flaps. Thus, the rolling moment increment is derived from two sources: a first source being due to increased angle of attack and a second source being due to increased surface area. It follows, then, that the net rolling moment produced by the combination of trailing edge flaps and the extendible leading edge airfoil increases with increasing dynamic pressure in contrast to the conventional approach. In this context, the "conventional approach"refers to the operation of the ailerons and/or flaps for generating rolling moment in rolling maneuvers.

Figure 1:
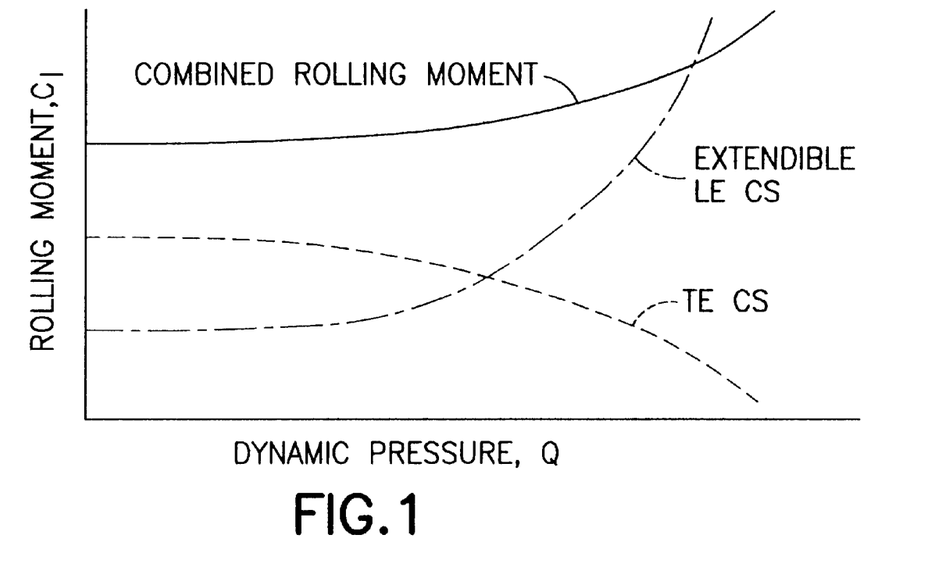
FIG. 1 is a graph representing rolling moment versus dynamic pressure for both trailing edge airfoils and leading edge airfoils and indicating the benefit which can be achieved by the invention.

Typical rolling moment distributions for the conventional control surface and with extended leading edge are depicted in FIG. 1. The rolling moment produced by the trailing edge flap alone on a flexible wing is denoted by TE CS. This rolling moment decreases with increasing dynamic pressure. On the other hand the rolling moment produced by the extendible leading edge flap (denoted by LE CS) increases with the dynamic pressure. The combined rolling moment, shown by the solid line, increases with the dynamic pressure. Thereby, the so-called roll reversal speed that exists for flexible aircraft with conventional flaps can be avoided and the "flexible aircraft"can be rendered agile even up to the aircraft limit speed. The term "flexible aircraft"refers to the modem design approach of constructing the aircraft with thinner gage metal in order to reduce weight while increasing agility. As to the term "roll reversal speed", it is noteworthy that if the wing is flexible, the effectiveness of the aileron during a rolling maneuver decreases with increasing speed. The torsion moment generated by the aileron twists the wing in the opposite direction. At some speed, aileron effectiveness becomes zero. If the pilot continues roll in the same direction, he has to pull back on the aileron stick. Hence, this speed is referred to as the "aileron reversal speed"or "roll reversal speed". Thus, any desired roll rate and pitch rate can be achieved by controlling the amount of leading edge movement with the help of standard flight control laws which is, generally, in the order of 2 to 4% of the local chord. Thus, the present invention takes advantage of a movable leading edge control surface in addition to the trailing edge control surface and the extent of forward movement of the movable leading edge control surface is about 2 to 4% of the local chord, that is, the width of the wing at any span station. Computers are used to actuate the control surfaces by the desired amount. This requirement is based on intended performance of the aircraft, such as desired roll rate and pitch rate of the aircraft. Thus, the deployment of trailing edge and leading edge control surfaces can be commanded in a coordinated sense by means of predetermined flight control laws.

The extendible leading edge flaps may move either parallel to the leading edge or parallel to the free stream, depending upon the arrangement of the wing rib constriction. To avoid operational interference due to bending, depending on the size of the aircraft, the outboard leading edge control surface can be divided into two or more separate components. It is contemplated that each section of the control surface will be operated by two servo units which will be mounted on two rib sections referred to as guide rails, that is, the sliding mechanism.

Each servo unit, or actuator, operates two push rods. These push rods perform two functions; to extend and to rotate the leading edge flap. The rods move in parallel to extend the leading edge flap while the trailing edge flaps are being deployed. This flap can also be rotated nose down or up at any extended position. For example to rotate the flap down, one rod stays stationary and the other rod moves forward. Depending upon the structural dimensions, any known kinematic mechanism can be employed to perform these dual functions of the double acting push rods.

Preferably, the skin of the leading edge flap overlaps on the wing box skin. The edges of the overlap can slide in a groove. The air gap between the sliding skins can be sealed or controlled during high angle of attack flight conditions to avoid stall.

Some advantages of the extendible leading edge flap concept include the following:

Tactical aircraft can perform rapid maneuvers even at high speeds.

The so-called aileron reversal speed can be practically eliminated.

Stress levels can be reduced and consequently the service life of fighter aircraft can be increased.

Structural weight can be reduced resulting in increased aircraft performance.

Flap and aileron rotations can be reduced because of wing untwisting produced by the lift distribution on the leading edge flaps. For example, trailing edge flap and aileron rotations of 20 to 30 degrees are required to roll an aircraft near the roll reversal speed. This can be reduced to as low as 5 to 10 degrees, since the roll effectiveness of these control surfaces increases with speed as seen in FIG. 1. This results in reduced drag.

Reduced control surface rotation also minimizes the radar cross section (RCS) which, is invaluable for the survivability of the tactical aircraft.

Extendible leading edge flaps can be installed with minimal design changes on new aircraft such as F-18E/F, JSF, ATF and unmanned tactical aircraft (UTA) and upgrades on existing fleet such as F-8A/B, F-18C/D, F-16, F-5, and T-38.

A primary feature, then of the present invention is the provision of an improved aircraft control system for offsetting the aeroelastic effect when performing roll maneuvers without increasing the structural rigidity of the wing.

Another feature of the present invention is the provision of an improved aircraft control system designed to avoid adverse wing twist and increase the aerodynamic effectiveness of the control surfaces of high performance tactical aircraft.

Still another feature of the present invention is the provision of an improved aircraft control system which imparts a nose-up pitching moment to oppose the wing twist caused by trailing edge flap/aileron deployment Yet another feature of the present invention is the provision of an improved aircraft control system which imparts additional lift to enhance roll and pitch maneuver performances of the aircraft.

Still a further feature of the present invention is the provision of an improved aircraft control system which controls leading edge flow separation during high angle of attack maneuvers. As the angle of attack increases, the air flow across the wing has the tendency to detach from the surface of the wing. This results in loss of suction pressure and, in turn, lift. This separation can be reduced by deploying the leading edge control surface downward or reducing the local angle of attack.

Yet a further feature of the present invention is the provision of an improved aircraft control system which reduces wing structural weight because of reduced strength requirements.

Still another feature of the present invention is the provision of an improved is aircraft control system which improves fatigue life of wing structural components because of reduced torsion moment and stress levels.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and together with the description, serve to explain the principles of the invention in general terms. Like numerals refer to like parts throughout the disclosure.

DETAILED DESCRIPTION OF THE PREFERRED EMBODIMENTS

Figure 2:
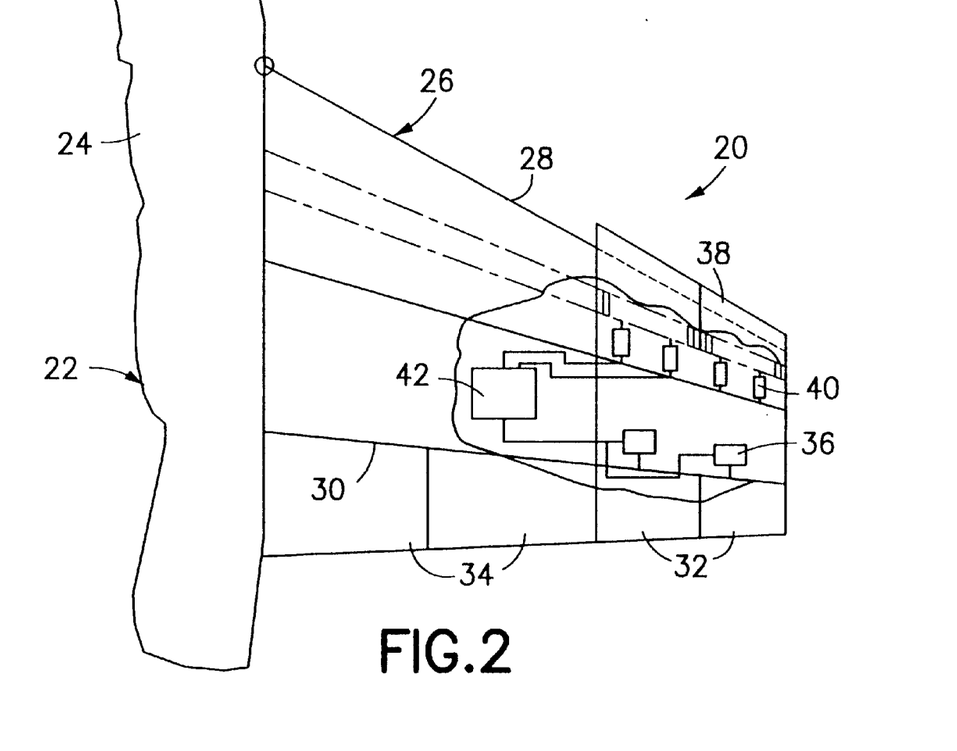
FIG. 2 is a diagrammatic top plan view of a wing of an aircraft embodying the invention, certain parts being cut away.
Figure 3:
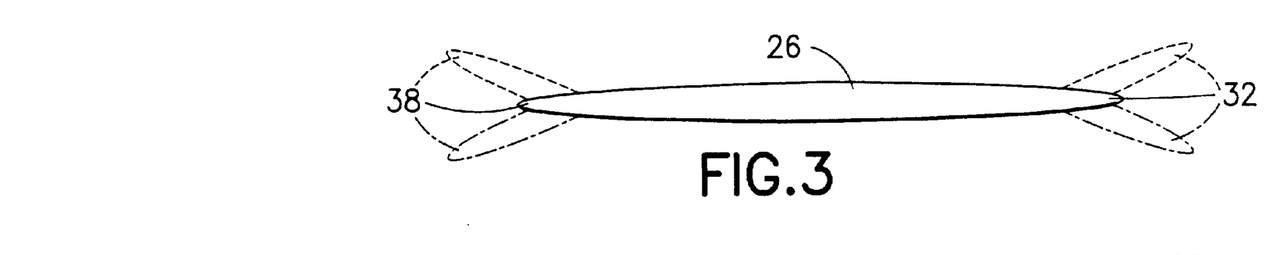
FIG. 3 is a side elevation view of the wing illustrated in FIG. 2 and illustrating different positions of the leading edge and trailing edge airfoils.

Turn now to the drawings and, initially, to FIG. 1 which generally illustrates, diagrammatically, a flight control system 20 for an aircraft 22 including a fuselage 24 and fixed wings 26. The wings 26 are supported on the fuselage and extend laterally from the fuselage and have leading and trailing edges 28, 30, respectively. The flight control system 20 comprises at least one trailing edge airfoil 32 which is pivotally mounted in a suitable manner at the trailing edge 30 of each of the wings and selectively movable between raised and lowered positions (see FIG. 3) for imparting rolling motion to the aircraft. In actual fact, in FIG. 2, two airfoils 32 are actually illustrated in a side-by-side relationship. Also illustrated in FIG. 2 are a pair of side-by-side flaps 34 which are not part of the invention but may be operable in the conventional manner. Trailing edge actuators 36 (FIG. 2) are operable for moving the trailing edge airfoils 32 between raised (see dashed lines in FIG. 3) and lowered (see dash-dot lines in FIG. 3) positions.

Figure 6:
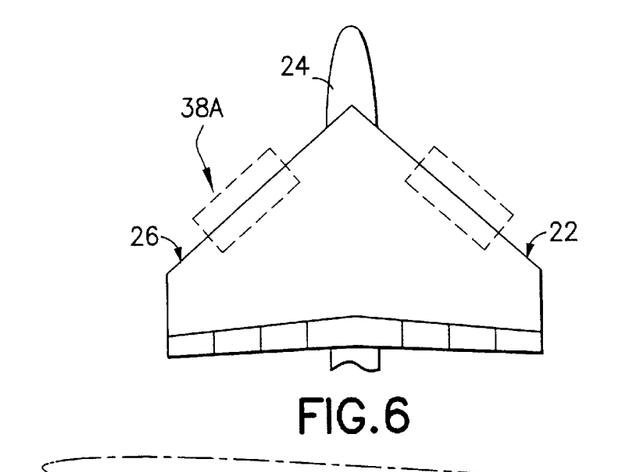
FIG. 6 is a diagrammatic plan view of an aircraft illustrating one embodiment of the invention.
Figure 7:
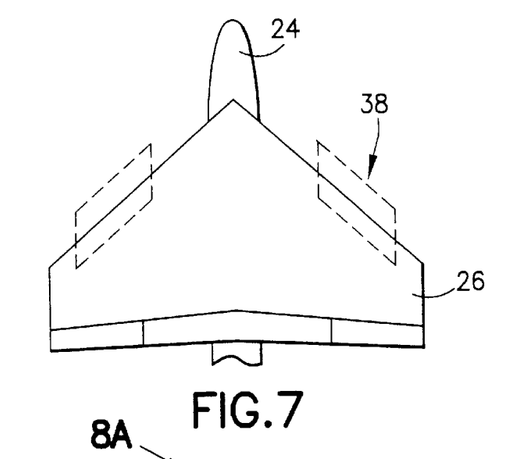
FIG. 7 is a diagrammatic plan view of an aircraft, similar to FIG. 6, illustrating another embodiment of the invention.

In a similar manner, leading edge airfoils 38 are mounted on each of the wings 26 adjacent the leading edge 28 and are movable transversely of the leading edge between a retracted position generally coextensive with the leading edge (see dashed line in FIG. 2) and all extended position protruding from the leading edge (see solid line in FIG. 2). The extendible leading edge airfoils may move either parallel to the leading edge (as shown by reference numeral 38A in FIG. 6) or parallel to the free stream (as shown by reference numeral 38 in FIG. 7). This depends on the arrangement of the wing rib constriction.

Actuators 40 are operable for moving the leading edge airfoils 38 between the retracted and extended positions and a suitable computer system 42, which in a known manner includes both hardware and software, is provided for operating the said trailing edge actuators 36 and the leading edge actuators 40 according to the flight control laws in a coordinated manner so as to impart countervailing aerodynamic forces on the wings to counteract the effects of aeroelastic wing deformation caused in response to operation of said trailing edge airfoil means by increasing the angle of attack of the wing and lift producing surface area of the wing.

Figure 8:
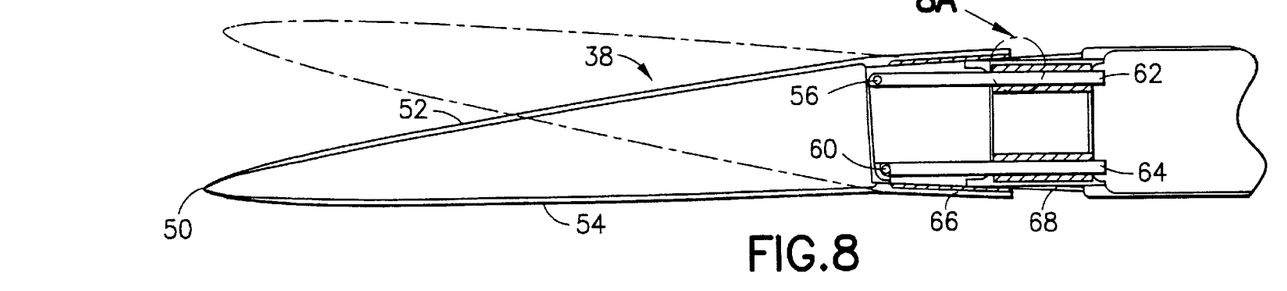
FIG. 8 is a detail cross section view, similar to FIGS. 4 and 5, certain parts depicted in their extended and raised or lowered positions.
Figure 8A:
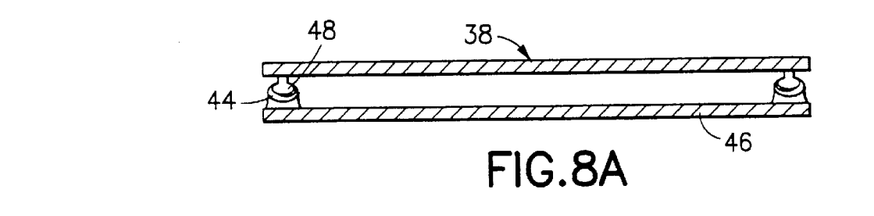
FIG. 8A is a detail cross section view taken generally from FIG. 8, as indicated.

More specifically, viewing FIGS. 8 and 8A, each of the wings 26 includes at least a pair of spaced apart guide rails 44 fixed to box structure 46 integral with the wing and extending generally transverse to the leading edge 28. Each leading edge airfoil 38 includes integral follower members 48 which are movably engaged with the guide rails 44 enabling movement of the leading edge airfoils between the retracted (FIG. 4) and extended positions (FIG. 5) in response to operation of the actuators 40.

Figure 4:
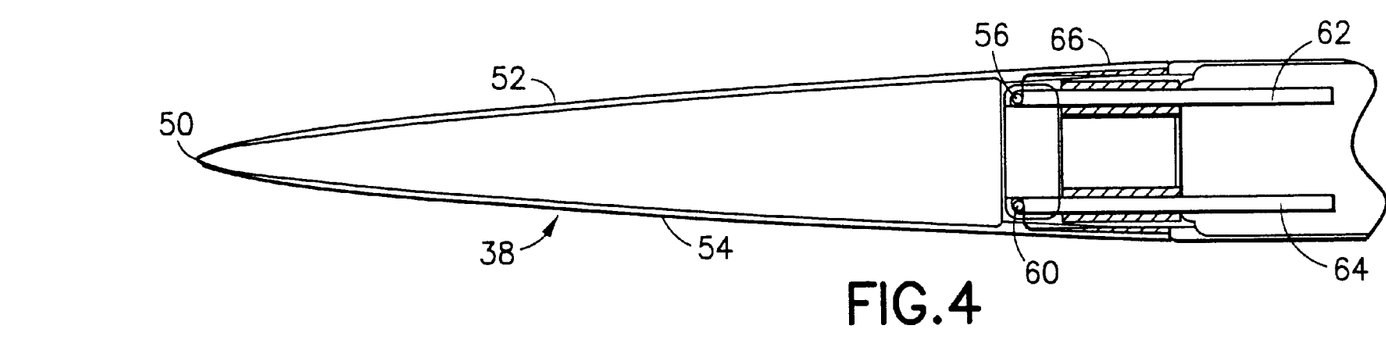
FIG. 4 is a detail cross section view of a portion of the wing, certain parts being depicted in their retracted positions.
Figure 5:
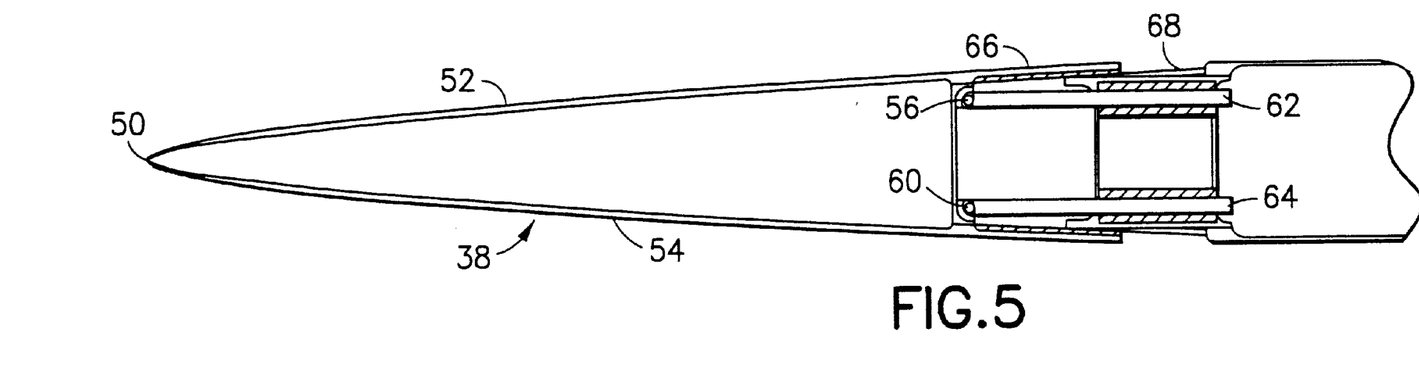
FIG. 5 is a detail cross section view, similar to FIG. 4, certain parts being depicted in their extended neutral positions.

As seen particularly well in FIGS. 4, 5, and 8, each leading edge airfoil 38 includes a nose 50, an upper surface 52, and a lower surface 54 spaced from the upper surface. Viewing FIG. 9, at least a pair of spaced apart integral upper ear members 56 are mounted on a transversely extending spar 58 integral with the wing adjacent the upper surface 52 and aft of the nose 50. Similarly, at least a pair of spaced apart integral lower ear members 60 are mounted on the spar 58 adjacent the lower surface 54 and aft of the nose.

Figure 9:
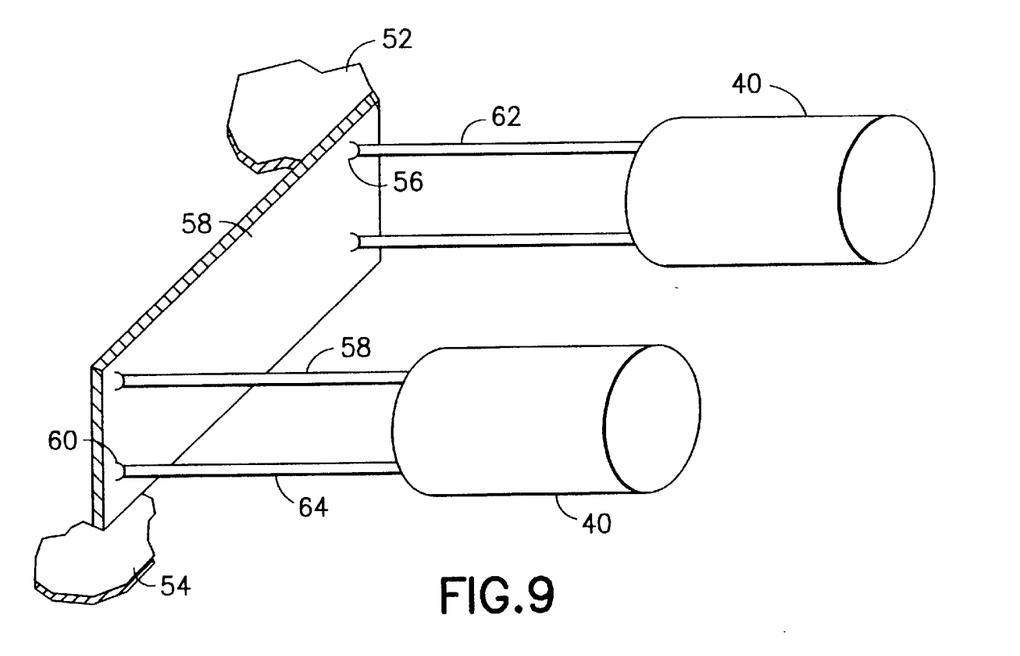
FIG. 9 is a detail perspective view of a portion of the components illustrated in FIG. 2.

A pair of actuators 40 are mounted on the box structure 46 at laterally spaced locations (FIGS. 2 and 9). An upper control rod 62 is operably mounted on each of the actuators and each of the upper control rods has a terminal end pivotally connected to an associated one of the upper ear members 56. In similar fashion, a lower control rod 64 is operably mounted on each of the actuators 40 and each of the lower control rods has a terminal end pivotally connected to an associated one of the lower ear members 60.

The pair of actuators 40 are operable simultaneously for moving their associated airfoil 38. In one instance, the upper control rods 62 and the lower control rods 64 move in unison to move the leading edge airfoil 38 between the retracted and extended positions with no change in its angular position relative to said wing. This movement is indicated, respectively, by FIGS, 4 and 5. In another instance, as indicated by solid lines, viewing FIG. 8, the upper control rods 62 move relative to the lower control rods 64 to move the leading edge airfoil means to the extended position while exhibiting a nose down position relative to the wing. In still another instance, as indicated by solid lines in FIG. 8, the upper control rods 62 move relative to the lower control rods 64 to move the leading edge airfoil to the extended position while exhibiting a nose up position relative to the wing.

Throughout this operation, skin 66 of the leading edge airfoil 38 overlaps on skin 68 of the wing box 46. The edges of the overlap can slide in a groove. The air gap between the sliding skins 66, 68 can be suitably sealed or controlled during high angle of attack flight conditions to avoid stall.

It will be appreciated that to avoid operational interference due to bending, depending on the size of the aircraft, instead of one large leading edge airfoil 38, two smaller adjacent airfoils may be provided as indicated in FIG. 2 together with appropriate actuating mechanisms. Of course, the invention would encompass any number of airfoils as may be desirable in a particular aircraft design.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. A flight control system for an aircraft including a fuselage having a longitudinal axis and fixed wings supported on and extending laterally from said fuselage, said wings having leading and trailing edges, respectively, said flight control system comprising:

trailing edge airfoil means pivotally mounted at said trailing edge of each of said wings and selectively movable on a laterally extending axis between raised and lowered positions for imparting roll movement to said aircraft;

trailing edge actuating means operable for moving said trailing edge airfoil means between the raised and lowered positions;

leading edge airfoil means mounted on each of said wings adjacent said leading edge, said leading edge airfoil means being movable transversely of said leading edge between a retracted position generally coextensive with said leading edge and an extended position protruding from said leading edge;

actuating means operable for moving said leading edge airfoil means between said retracted and said extended positions; and computer means for operating said trailing edge actuator means and said leading edge actuating means in a coordinated manner so as to impart countervailing aerodynamic forces on said wings to counteract the effects of aeroelastic wing deformation caused in response to operation of said trailing edge airfoil means by increasing the angle of attack of said wing and lift producing surface area of said wing.

2. A flight control system as set forth in claim 1 wherein each of said wings includes at least a pair of spaced apart guide rails fixed thereto and extending generally transverse to said leading edge; and wherein said leading edge airfoil means includes integral follower members movably engaged with said guide rails enabling movement of said leading edge airfoil means between said retracted and said extended positions in response to operation of said actuating means.

3. A flight control system as set forth in claim 1 wherein each of said wings includes at least two pair of spaced apart guide rails fixed thereto and extending generally transverse to said leading edge; and wherein said leading edge airfoil means includes a pair of side by side airfoil members each including integral follower members movably engaged with said guide rails enabling movement of said leading edge airfoil means between said retracted and said extended positions in response to operation of said actuating means.

4. A flight control system as set forth in claim 1 wherein each of said wings includes at least a pair of spaced apart guide rails fixed thereto and extending generally parallel to the longitudinal axis of said fuselage; and wherein each of said leading edge airfoil members includes integral follower members movably engaged with said guide rails enabling movement of said leading edge airfoil means between said retracted and said extended positions in response to operation of said actuating means.

5. A flight control system as set forth in claim 1 wherein each of said wings includes at least two pair of spaced apart guide rails fixed thereto and extending generally parallel to the longitudinal axis of said fuselage; and wherein each of said leading edge airfoil members includes integral follower members movably engaged with said guide rails enabling movement of said leading edge airfoil means between said retracted and said extended positions in response to operation of said actuating means.

6. A flight control system as set forth in claim 1 wherein each of said wings includes an integral structural box member;

wherein each leading edge airfoil means includes a nose, an upper surface, and a lower surface spaced from said upper surface, at least a pair of spaced apart integral upper ear members adjacent said upper surface and aft of said nose, and at least a pair of spaced apart integral lower ear members adjacent said lower surface and aft of said nose;

wherein said actuating means includes a pair of actuator mechanisms mounted on said box member at laterally spaced locations, an upper control rod operably mounted on each of said actuator mechanisms, each of said upper control rods having one end pivotally connected to an associated one of said upper ear members, and a lower control rod operably mounted on each of said actuator mechanisms, each of said lower control rods having one end pivotally connected to an associated one of said lower ear members;

said pair of actuator mechanisms being operable simultaneously such that, in one instance, said upper control rods and said lower control rods move in unison to move said leading edge airfoil means between the retracted and extended positions with no change in its angular position relative to said wing, and such that, in another instance, said upper control rods move relative to said lower control rods to move said leading edge airfoil means to the extended position while exhibiting a nose down position relative to said wing, and such that, in still another instance, said upper control rods move relative to said lower control rods to move said leading edge airfoil means to the extended position while exhibiting a nose up position relative to said wing.

* * * * *

UNITED STATES PATENT AND TRADEMARK OFFICE
CERTIFICATE OF CORRECTION

PATENT NO : 5,921,506
DATED : July 13, 1999
INVENTOR(S): Kari Appa

It is certified that error appears in the above-identified patent and that said Letters Patent are hereby corrected as shown below:

In Column 1, line 2, insert:

--STATEMENT OF GOVERNMENT RIGHTS

This invention was made with Government Support under contract

F33615-95-C-3202 awarded by the United States Air Force. The

Government has certain rights in this invention.--

Signed and Sealed this

Seventeenth Day of April, 2001

Attest:

NICHOLAS P. GODICI

*Attesting Officer*  *Acting Director of the United States Patent and Trademark Office*